3,076,041
PROCESS FOR PREPARING TETRAFLUORO-1,2-DIIODOETHANE
Robert R. Twelves, McDaniel Crest, Wilmington, Del., and Viktor Weinmayr, Landenberg, Pa., assignors to E. I. du Pont de Nemours and Company, Wilmington, Del., a corporation of Delaware
No Drawing. Filed Jan. 18, 1961, Ser. No. 83,359
8 Claims. (Cl. 260—653)

This invention relates to a process for the preparation of 1,1,2,2-tetrafluoro-1,2-diiodoethane, particularly by the iodination of tetrafluoroethylene.

1,1,2,2-tetrafluoro-1,2-diiodoethane is known in the art to be useful as a polymerization modifier, particularly for diene polymerizations, such as butadiene and chloroprene polymerizations, and copolymerizations thereof with each other or with styrene, acrylonitrile or other suitable monomers. The compound is also useful as a chemical intermediate in replacement reactions involving iodine atoms.

The methods disclosed in the art for the preparation of 1,1,2,2-tetrafluoro-1,2-diiodoethane have numerous drawbacks which make its manufacture difficult and hazardous on a commercial scale. It has previously been prepared by the direct reaction of tetrafluoroethylene and iodine at elevated pressures and temperatures. Iodine readily sublimes and plugs all the lines, preventing further reaction with tetrafluoroethylene. It has been proposed to dissolve iodine in an organic solvent prior to reaction with tetrafluoroethylene. However, the solubility of iodine in organic solvents, with the exception of diethyl ether, is low. In addition the hazards of using organic solvents, and especially ether, on a large scale at elevated temperatures and under pressure are well known. Organic solvents have the further disadvantage that 1,1,2,2-tetrafluoro-1,2-diiodoethane is miscible with them and a separation must be accomplished by distillation. Because of the instability of 1,1,2,2-tetrafluoro-1,2-diiodoethane, the distillation must be carried out under reduced pressure. Its low boiling point of 113° C. at 760 mm. prevents the use of many commercial solvents because their boiling points are too close to it to make an easy separation possible.

It is an object of this invention to provide a new and improved process for preparing 1,1,2,2-tetrafluoro-1,2-diiodoethane. Another object is to provide such a process which does not have the disadvantages of the prior processes and which is useful and economical to employ on a commercial scale. A further object is to provide such a process which gives high yields of a high purity product. A particular object is to provide a process employing an aqueous reaction medium from which the product can be readily and more economically separated. Other objects are to advance the art. Still other objects will appear hereinafter.

The above and other objects of this invention may be accomplished by the process for preparing 1,1,2,2-tetrafluoro-1,2-diiodoethane which comprises reacting tetrafluoroethylene with a liquid aqueous alkali metal polyiodide, usually at a temperature of from about 50° C. to about 200° C. and under a pressure of from about 25 to about 1000 pounds per square inch gauge.

Iodine is substantially insoluble in water, and the presence of an alkali metal chloride or alkali metal bromide does not increase the solubility of iodine in water to any appreciable extent, whereby the use of iodine in such media has not been practical for the preparation of 1,1,2,2-tetrafluoro-1,2-diiodoethane. Also, the alkali metal monoiodides are not effective for producing the desired reaction. Furthermore, tetrafluoroethylene is also considered to be substantially insoluble in aqueous media.

However, it has now been found that the iodine in the alkali metal polyiodides which is in excess of that required to form the monoiodide, when such polyiodides are used in the process of this invention, readily reacts with tetrafluoroethylene to form the desired product. It was unobvious that such iodine would be available to so react; in other words, it was unobvious that the iodine in the complex would not be so tightly bound as to be substantially unreactive with tetrafluoroethylene, particularly in an aqueous medium. The process of this invention overcomes the disadvantages of the prior processes employing organic solvents. Also, the alkali metal polyiodide reacts with tetrafluoroethylene to provide high yields of 1,1,2,2-tetrafluoro-1,2-diiodoethane which can be easily and economically separated from the reaction mixture in a highly pure condition suitable for most uses without further purification. Thereby, the process is particularly adapted for the commercial manufacture of 1,1,2,2-tetrafluoro-1,2-diiodoethane.

Broadly, the process of this invention comprises reacting tetrafluoroethylene with a normally liquid aqueous alkali metal polyiodide, usually at a temperature of from about 50° C. to about 200° C. and a pressure of from about 25 to about 1000 pounds per square inch gauge (p.s.i.g.). Conveniently, tetrafluoroethylene is added to a reaction vessel containing the aqueous alkali metal polyiodide at room temperature, the reaction vessel is closed, and the temperature is then raised to the desired temperature, preferably from about 90° C. to about 150° C. The pressure depends upon the amount of tetrafluoroethylene used, the available free space in the reaction vessel, and the temperature employed, and is the autogenous pressure obtained under such conditions. Preferably, the pressure will be from about 100 to about 600 pounds per square inch gauge.

When the reaction is complete, the reaction mixture is cooled to about room temperature and the 1,1,2,2-tetrafluoro-1,2-diiodoethane is separated therefrom. This separation is exceedingly simple because the 1,1,2,2-tetrafluoro-1,2-diiodoethane is insoluble in the aqueous medium and has a high specific gravity (2.6) whereby it separates readily from the aqueous medium in a purity suitable for immediate use for most purposes. The supernatant aqueous layer containing the alkali metal monoiodide can be reused by adding iodine thereto to form more aqueous alkali metal polyiodide.

The process can also be advantageously adapted for a continuous operation. In a continuous operation, the liquid aqueous metal polyiodide will be continuously fed into the reaction vessel, containing a body of the aqueous alkali metal polyiodide heated to the chosen reaction temperature, while maintaining a tetrafluoroethylene pressure sufficient to promote the reaction in a desired time. Provisions for efficient agitation will be made to provide intimate contact between the reactants. Simultaneously, an amount of the reaction mass, corresponding approximately to the amount of liquid alkali metal polyiodide introduced plus the 1,1,2,2-tetrafluoro-1,2-diiodoethane formed, will be continuously withdrawn through a suitable valve. The 1,1,2,2-tetrafluoro-1,2-diiodoethane separates by gravity from the withdrawn reaction mass in a highly pure form. Fresh iodine will be added to the supernatant aqueous layer which will then be recycled to the process.

The liquid aqueous alkali metal polyiodide is readily prepared by mixing an alkali metal monoiodide with iodine in water in the desired proportions to provide a normally liquid product, that is, a product which is liquid at normal temperatures and pressures. Any alkali metal monoiodide may be used such as the sodium, potassium, lithium, rubidium and cesium monoiodides. However, for practical purposes, the alkali metal monoiodide will be one having an atomic number of 11–19, i.e. sodium or potassium monoiodide.

It is well known that, when iodine is added to an aqueous solution of an alkali metal monoiodide, it combines therewith to form an alkali metal polyiodide containing from about 3 to about 9 atoms of iodine per atom of alkali metal. [Z. Anorg. Chem. 50, 405 (1906)]. Solutions containing by weight as much as 27% KI, 66% $I_2$ and 7% water, can be made and are free-flowing liquids. [J.A.C.S. 33, 1933 (1911)]. Also, hydrates of the formula $Na_2I_8$ and $Na_4I_{14}$ are known. In the liquid aqueous alkali metal polyiodides of the present invention, the particular polyiodide or polyiodides formed are not known exactly, and it is possible that a mixture of polyiodides are present. The exact composition of the particular polyiodides formed appears to be unimportant, so long as they are water soluble and form normally liquid aqueous compositions.

The concentrations of the alkali metal iodides in the aqueous compositions may vary over a wide range, up to and including saturated solutions. Usually, the liquid aqueous alkali metal polyiodides are formed from aqueous solutions of from about 5% to about 50% by weight of alkali metal monoiodide and from about 0.5 to about 4 moles of iodine for each mole of alkali metal monoiodide. Preferably, the alkali metal monoiodide will be in a concentration of about 15% to about 45% by weight of the aqueous solution, and the iodine added thereto will be from about 0.5 to about 1.5 moles per mole of monoiodide. Usually, and particularly with the smaller proportions of iodine, only part of the alkali metal monoiodide will be converted to the alkali metal polyiodide, and hence the liquid product will contain an excess of unreacted alkali metal monoiodide which, in many cases, increases the solubility of the alkali metal polyiodide in the aqueous medium. It will be understood that, as the reaction proceeds, iodine is extracted from the alkali metal polyiodide by the tetrafluoroethylene to produce 1,1,2,2-tetrafluoro-1,2-diiodoethane and the alkali metal polyiodide is converted to the corresponding monoiodide.

Usually, the amount of tetrafluoroethylene employed will correspond to about 1 mole or a slight excess thereof for each mole of iodine which is combined with the alkali metal monoiodide to form the polyiodide, that is, for each mole of iodine that is employed to form the alkali metal polyiodide from the monoiodide.

In order to more clearly illustrate this invention, preferred modes of carrying it into effect, and the advantageous results to be obtained thereby, the following examples are given in which the parts and proportions are by weight except where specifically indicated otherwise.

*Example 1*

A liquid aqueous potassium polyiodide (prepared by dissolving 96 parts of iodine and 125 parts of potassium iodide in 150 parts of water) was charged into a pressure vessel, and 55 parts of tetrafluoroethylene were added at room temperature. The temperature of the charge was raised to 100° C. over a period of about one hour. The pressure increased from an initial 390 p.s.i.g. at 16° C. to 890 p.s.i.g. at 100° C. and then dropped to 550 p.s.i.g. over a period of four hours while the charge was being agitated at 100° C. Thereafter, the pressure remained constant, indicating that the reaction had gone to completion. The charge was cooled. The contents of the pressure vessel were discharged at about 25° C. A separation into a bottom layer of colorless oil and a top layer of pale yellow water took place. The bottom layer was separated and was pure 1,1,2,2-tetrafluoro-1,2-diiodoethane, amounting to 120 parts, equal to a yield of 91% of theory based on the amount of iodine charged.

The product was identified as 1,1,2,2-tetrafluoro-1,2-diiodoethane by nuclear magnetic resonance analysis and by gas chromatography.

*Example 2*

Following the details of Example 1, a liquid aqueous potassium polyiodide (prepared by dissolving 64 parts of iodine and 29 parts of potassium iodide in 150 parts of water) was reacted with 30 parts of tetrafluoroethylene for ten hours at 150° C. the reaction occurred from about 50° C., as was observed from the variation in pressure of 500 p.s.i.g. at 50° C. to a maximum of 590 p.s.i.g. at 100° C. and then a decrease to 475 p.s.i.g. at 150° C. 1,1,2,2-tetrafluoro-1,2-diiodoethane (45 parts) was separated as in Example 1.

*Example 3*

Following the details of Example 1, a liquid aqueous sodium polyiodide (prepared by dissolving 127 parts of iodine and 75 parts of sodium iodide in 150 parts of water) and 55 parts of tetrafluoroethylene was heated to 115° C. for 12 hours. The maximum pressure reached was 680 p.s.i.g. which dropped to 500 p.s.i.g. over a period of four hours. Thereafter, the pressure remained constant, indicating that the reaction was completed in four hours. Upon discharging the contents of the pressure vessel, the colorless 1,1,2,2-tetrafluoro-1,2-diiodoethane separated from the pale yellow water layer. 148 parts of 1,1,2,2-tetrafluoro-1,2-diiodoethane were obtained, equal to a yield of 83.6% of theory based on the amount of iodine charged.

It will be understood that the preceding examples have been given for illustrative purposes solely and that, subject to the limitations set forth in the general description, the alkali metals, the proportions, conditions, and techniques employed may be widely varied without departing from the spirit or scope of this invention.

From the preceding description, it will be apparent that this invention provides a novel process for the preparation of 1,1,2,2-tetrafluoro-1,2-diiodoethane which avoids the disadvantages of the processes previously employed. Particularly, the process is simple and far more economical to operate than prior processes, especially on a commercial scale, and provides high yields of the desired product which is readily and economically isolated in a highly pure condition. Accordingly, this invention constitutes a valuable advance in and contribution to the art.

The embodiments of the invention in which an exclusive property or privilege is claimed are defined as follows:

1. The process for preparing 1,1,2,2-tetrafluoro-1,2-diiodoethane which comprises reacting tetrafluoroethylene with a liquid aqueous alkali metal polyiodide at a temperature of from about 50° C. to about 200° C. and a pressure of from about 25 to about 1000 pounds per square inch gauge.

2. The process for preparing 1,1,2,2-tetrafluoro-1,2-diiodoethane which comprises reacting tetrafluoroethlyene with a liquid aqueous potassium polyiodide at a temperature of from about 50° C. to about 200° C. and a pressure of from about 25 to about 1000 pounds per square inch gauge.

3. The process for preparing 1,1,2,2-tetrafluoro-1,2-diiodoethane which comprises reacting tetrafluoroethylene with a liquid aqueous sodium polyiodide at a temperature of from about 50° C. to about 200° C. and a pressure of from about 25 to about 1000 pounds per square inch gauge.

4. The process for preparing 1,1,2,2-tetrafluoro-1,2-diiodoethane which comprises reacting tetrafluoroethylene with a liquid aqueous alkali metal polyiodide at a temperature of from about 50° C. to about 200° C. and a pressure of from about 25 to about 1000 pounds per square inch gauge, said aqueous alkali metal polyiodide being prepared by dissolving, in an aqueous solution of from about 5% to about 50% by weight of an alkali metal monoiodide, from about 0.5 to about 4 moles of iodine for each mole of alkali metal monoiodide.

5. The process for preparing 1,1,2,2-tetrafluoro-1,2-diiodoethane which comprises reacting tetrafluoroethylene with a liquid aqueous alkali metal polyiodide at a temperature of from about 90° C. to about 150° C. and a pressure of from about 100 to about 600 pounds per square inch gauge, said aqueous alkali metal polyiodide being prepared by dissolving, in an aqueous solution of from about 5% to about 50% by weight of an alkali metal monoiodide, from about 0.5 to about 4 moles of iodine for each mole of alkali metal monoiodide.

6. The process for preparing 1,1,2,2-tetrafluoro-1,2-diiodoethane which comprises reacting tetrafluoroethylene with a liquid aqueous alkali metal polyiodide at a temperature of from about 90° C. to about 150° C. and a pressure of from about 100 to about 600 pounds per square inch gauge, said alkali metal polyiodide being prepared by dissolving, in an aqueous solution of from about 15% to about 45% by weight of an alkali metal monoiodide, from about 0.5 to about 1.5 moles of iodine for each mole of alkali metal monoiodide.

7. The process for preparing 1,1,2,2-tetrafluoro-1,2-diiodoethane which comprises reacting tetrafluoroethylene with a liquid aqueous potassium polyiodide at a temperature of from about 90° C. to about 150° C. and a pressure of from about 100 to about 600 pounds per square inch gauge, said aqueous potassium polyiodide being prepared by dissolving in an aqueous solution of from about 15% to about 45% by weight of potassium monoiodide, from about 0.5 to about 1.5 moles of iodine for each mole of potassium monoiodide.

8. The process for preparing 1,1,2,2-tetrafluoro-1,2-diiodoethane which comprises reacting tetrafluoroethylene with a liquid aqueous sodium polyiodide at a temperature of from about 90° C. to about 150° C. and a pressure of from about 100 to about 600 pounds per square inch gauge, said aqueous sodium polyiodide being prepared by dissolving in an aqueous solution of from about 15% to about 45% by weight of sodium monoiodide, from about 0.5 to about 1.5 moles of iodine for each mole of sodium monoiodide.

References Cited in the file of this patent

UNITED STATES PATENTS 2,424,667     Raasch _____ July 29, 1947

OTHER REFERENCES

Jakowkin: "Zeitschrift für Physikalische Chemie," vol. 20 (1896), pp. 19–39.